United States Patent
Taniguchi et al.

[11] Patent Number: 5,676,723
[45] Date of Patent: Oct. 14, 1997

[54] MOLD FOR FORMING AN OPTICAL ELEMENT

[75] Inventors: Yasushi Taniguchi, Kawasaki; Keiji Hirabayashi, Tokyo, both of Japan

[73] Assignee: Canon Kabushiki Kaisha, Tokyo, Japan

[21] Appl. No.: 786,180

[22] Filed: Jan. 21, 1997

Related U.S. Application Data

[63] Continuation of Ser. No. 484,914, Jun. 7, 1995, abandoned, which is a continuation of Ser. No. 77,742, Jun. 18, 1993, abandoned.

[30] Foreign Application Priority Data

Jun. 25, 1992 [JP] Japan .................................. 4-190308

[51] Int. Cl.$^6$ .................................................. C03B 11/06
[52] U.S. Cl. .................... 65/286; 65/305; 65/374.1; 65/374.11; 65/374.15; 65/24; 65/60.2; 65/60.6; 65/64; 425/808
[58] Field of Search ............................ 65/374.15, 374.11, 65/374.12, 169, 60.1, 60.2, 60.3, 60.4, 60.5, 60.6, 60.8, 64, 24, 26, 286, 305; 249/114.1, 115, 116; 425/808

[56] References Cited

U.S. PATENT DOCUMENTS

| | | | |
|---|---|---|---|
| 4,168,961 | 9/1979 | Blair | 65/66 |
| 4,882,827 | 11/1989 | Kusumi et al. | 65/374.15 |
| 4,932,331 | 6/1990 | Kurihara et al. | 106/286.1 |
| 4,935,303 | 6/1990 | Ikoma et al. | 428/408 |
| 4,948,627 | 8/1990 | Hata et al. | |
| 5,008,002 | 4/1991 | Uno et al. | |
| 5,026,415 | 6/1991 | Yamamoto et al. | 65/305 |
| 5,202,156 | 4/1993 | Yamamoto et al. | 427/135 |
| 5,202,571 | 4/1993 | Hirabayashi et al. | 257/10 |

FOREIGN PATENT DOCUMENTS

| | | |
|---|---|---|
| 3832907 | 4/1989 | Germany . |
| 3917752 | 12/1989 | Germany . |
| 4002681 | 8/1990 | Germany . |
| 49-51112 | 9/1972 | Japan . |
| 52-45613 | 4/1977 | Japan . |

(List continued on next page.)

OTHER PUBLICATIONS

Patent Abstracts of Japan, vol. 15, No. 52 (C–803), Feb. 7, 1991 & JP-A-22 83 627 (Asahi Optiacl Co. Ltd.), Nov. 21, 1990 *abstract*.
Patent Abstracts of Japan, vol. 12, No. 70 (C–479) Mar. 4, 1988 & JP-A-62 207 726 (Hoya Corp), Sep. 12, 1987 *abstract*.
Patent Abstracts of Japan, vol. 12, No. 11 (C–468), Jan. 13, 1988 & JP-A-62 167 229 (Olympus Optical Co), Jul. 23, 1987 *abstract*.
Patent Abstracts of Japan, vol. 14, No. 314 (C–737), Jul. 5, 1990 & JP-A-02 107 532 (Canon Inc), Apr. 19, 1990 *abstract*.
Patent Abstracts of Japan, vol. 15, No. 377 (C–870), Sep. 24, 1991 & JP-A-03 153 535 (Canon Inc), Jul. 1, 1991 *abstract*.
Patent Abstracts of Japan, vol. 15, No. 377 (C–870), Sep. 24, 1991 & JP-A-03 153 534 (Canon Inc), Jul. 1, 1991 *abstract*.
Patent Abstracts of Japan, vol. 11, No. 141 (C–421), May 8, 1987 & JP-A-61 281 030 (Olympus Optical Co), Dec. 11, 1986 *abstract*.

*Primary Examiner*—Steven P. Griffin
*Attorney, Agent, or Firm*—Fitzpatrick, Cella, Harper & Scinto

[57] ABSTRACT

There is disclosed a mold for pressing molding of an optical element of glass. On at least the molding surface of the mold base of the mold, there is formed a mixing layer which consists of carbon and at least one of the elements constituting the mold base. The atomic percentage of carbon increases toward the molding surface and decreases toward the mold base, while the atomic percentage of the other element decreases toward the surface and increases toward the mold base. The mold may contain an intermediate layer at least on the molding surface of the mold base.

7 Claims, 8 Drawing Sheets

FOREIGN PATENT DOCUMENTS

| | | |
|---|---|---|
| 60-246230 | 12/1985 | Japan . |
| 61-183134 | 8/1986 | Japan . |
| 61-281030 | 12/1986 | Japan . |
| 2-31012 | 9/1987 | Japan . |
| 64-83529 | 3/1989 | Japan . |
| 1301864 | 12/1989 | Japan . . |
| 2-80331 | 3/1990 | Japan ................................ 65/374.15 |
| 2-83221 | 3/1990 | Japan ................................ 65/374.15 |
| 2-149435 | 6/1990 | Japan ................................ 65/374.15 |
| 2-283627 | 11/1990 | Japan ................................ 65/374.15 |
| 3-153534 | 7/1991 | Japan ................................ 65/374.15 |

MOLD FOR FORMING AN OPTICAL ELEMENT

This application is a continuation, of application Ser. No. 08/484,914 filed Jun. 7, 1995, now abandoned, which is a continuation of application Ser. No. 08/077,742 filed Jun. 18, 1993, now abandoned.

BACKGROUND OF THE INVENTION

1. Field of the Invention

The present invention relates to a mold for forming a glass optical element such as a lens or a prism by pressing molding of glass material.

2. Related Background Art

The lens manufacturing technology by press molding of glass material without polishing process has enabled simple and inexpensive preparation of lenses, dispensing with the complex process steps required in the conventional technology, and is recently employed for producing not only lenses but also other glass optical elements such as prism.

The mold employed in such press molding of glass optical elements is required to be excellent in hardness, heat resistance, mold releasing property and ease of mirror surface finishing. For the material constituting such mold, there have been made various proposals such as metals, ceramics and materials coated therewith. Examples of such material include 13Cr martensite steel disclosed in the Japanese Patent Laid-Open Application No. 49-51112, SiC and $Si_3N_4$ disclosed in the Japanese Patent Laid-Open Application No. 52-45613, an ultra hard alloy coated with a precious metal disclosed in the Japanese Patent Laid-Open Application No. 60-246230, materials coated with a diamond thin film and a diamond-like carbon film disclosed in the Japanese Patent Laid-Open Application Nos. 61-183134 61-281030 and 1-301864, and materials coated with a hard carbon film disclosed in the Japanese Patent Laid-Open Application No. 64-83529. Also, the Japanese Patent Publication No. 2-31012 discloses formation of a carbon film of 50–5000 Å on either the lens or the mold.

However, 13Cr martensite steel has drawbacks of being easily oxidized, and of causing glass coloration due to Fe diffusion into the glass at high temperature. SiC and $Si_3N_4$ are generally considered as being hardly oxidized, but are still oxidized at high temperature, thus generating a fusion to glass because of $SiO_2$ film formation on the surface. Also, the working of the mold itself is extremely difficult because of the high hardness of the material. The material coated with precious metal does not fuse to glass, but is easily damaged or deformed, because it is extremely soft.

The thin diamond film is hard and thermally stable, but it requires finishing to a mirror surface because it is a polycrystalline film having a high surface roughness. Also, the mold employing a diamond-like carbon (DLC) film, a hydrogenated amorphous carbon (a-C:H) film or a hard carbon film shows satisfactory releasing property of mold from glass, thus being free from fusion of glass, but the sufficient molding property may not be obtained in the molded product after several hundred molding operations, due to partial peeling of the film.

This phenomenon will be ascribable to the following factors.

(1) The above-mentioned films have very large compression stresses, and generate peeling or cracks as a result of the release of stress resulting from rapid heating and rapid cooling in the molding process. Similar phenomena are also induced by the thermal stress resulting from the thermal cycles and the difference in thermal expansion coefficient between the film and the base material of the mold.

(2) In certain base materials of the mold, the film may not be locally formed or may be locally formed thinner, depending on the surface state. For example, in sintered materials such as WC-Co, SiC or $Si_3N_4$, the void of grain or the pore formation at sintering is unavoidable, so that the polished molding surface contains holes of several microns or larger. When the film is formed on such surface, it is often not formed or becomes extremely thin in such holes. Because the film becomes inferior in adhesion strength or mechanical strength, such locations tend to generate film peeling or cracks.

(3) The sintering aid in the sintered body, represented by Co in WC-Co, forms an alloy by diffusion with the film. In the molding operation, such portion causes fusion of glass and generates precipitation by reaction with the glass and component, thus deteriorating durability of the mold. As explained above, there has not been realized a mold for forming an optical element, excellent in molding property, durability and economic performance.

The Japanese Patent Publication No. 2-31012 teaches that a carbon film thickness in a range of 50 to 5000 Å is acceptable, though a film thickness less than 50 Å reduces the effect of the carbon film because of the unevenness of the film, while a film thickness exceeding 5000 Å deteriorates the surface precision in the press molding. However, the carbon film disclosed in the embodiments in the publication is peeled in the molding process because of insufficient adhesion to the base material or of a large compression stress. As a result, there is encountered glass fusion or defect in the appearance of the molded product, in the position of such film peeling, so that the practical mold with excellent durability has not been provided.

SUMMARY OF THE INVENTION

The above-mentioned drawbacks of the prior technology have been resolved, according to the present invention, by a mold comprising, at least on the molding surface of mold base of the mold, a mixing layer consisting of carbon and at least an element constituting the mold base or an intermediate layer formed on the surface of the mold base.

More specifically, the present invention provides a mold for press molding of a glass optical element, comprising, at least on the molding surface of the base mold of the mold, a mixing layer which consists of carbon and at least an element constituting the mold base and in which the concentration of carbon atoms increases toward the surface and decreases toward the mold base of the mold while the concentration of other atoms decreases toward the surface and increases toward the mold base.

Also, the present invention provides a mold for press molding of a glass optical element, comprising, at least on the molding surface of the mold base of the mold, an intermediate layer provided at the surface thereof with a mixing layer which consists of carbon and at least an element constituting the intermediate layer and in which the concentration of carbon atoms increases toward the surface and decreases toward the intermediate layer while the concentration of other atoms decreases toward the surface and increases toward the intermediate layer.

Figure 1A:
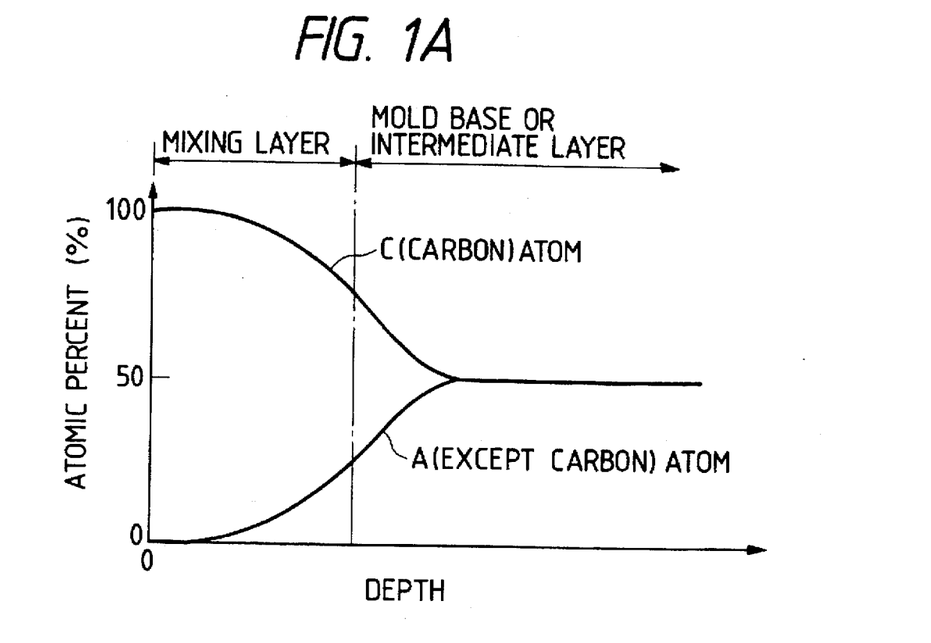
FIGS. 1A and 1B are views schematically showing the atom mixing state in a mixing layer, formed on the molding surface of the mold for optical element of the present invention.
Figure 1B:
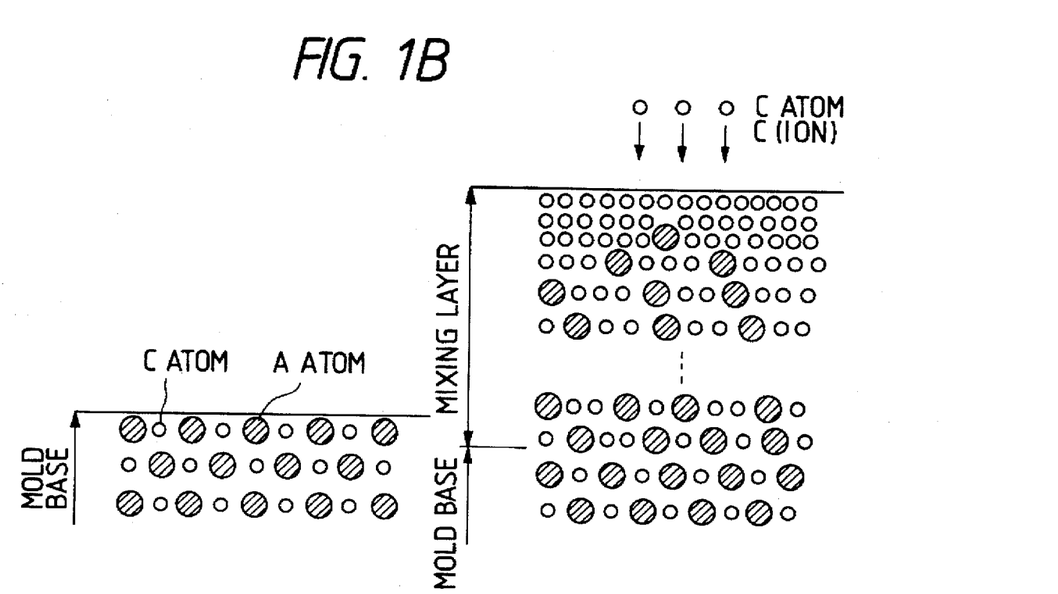

The material for the mold base of the present invention is selected, for example, from WC, SiC, TiC, TaC, BN, TiN, AlN, $Si_3N_4$, $SiO_2$, $Al_2O_3$, $ZrO_2$, W, Ta, Mo, thermet, thialon, mulite and WC-Co alloy. Carbon has been employed in the mold for glass molding for a long time, because of its low adhesive force to glass. In a glass mold, utilizing this property of carbon and glass, a hard and smooth carbon film is formed on the molding surface of the mold base, and examples of carbon film include a diamond film, a diamond-like carbon (DLC) film, a hydrogenated amorphous carbon (a-C:H) film and a hard carbon film. However, the diamond film requires mirror surface finishing, because it is polycrystalline and has a rough surface. On the other hand, the DLC, a-H:C and hard carbon films in the amorphous state have a large internal stress, lack thermal stability at the high temperature region of glass molding, and lose the adhesion strength between the mold base and the film as the molding operation is repeated. Stated differently, the principal drawback of the carbon film employed as the surface material of the glass mold is related to the adhesion strength between the mold base of the mold and the film. This drawback can be resolved by forming the molding surface by a mixing layer, consisting of carbon and at least an element constituting the mold base or an intermediate layer formed on the surface of the mold base. The mixing layer has an extremely good adhesion since the carbon atoms are subjected to atomic mixing with the constituent of the mold base or of the intermediate layer formed on the mold base. In the mixing layer, the atomic percentage of carbon increases toward the surface and decreases toward the mold base, while that of other atoms decreases toward the surface and increases toward the mold base. FIG. 1A schematically shows said state, and FIG. 1B illustrates the concept of internal structure. In FIG. 1A, the abscissa represents the depth from the surface to the mold base, and the ordinate indicates the atomic percentage. If the atomic percentage of carbon at the surface is sufficiently high, there is achieved satisfactory releasing property from glass, and a precipitate will not be formed resulting from the reaction with glass. The thickness of the mixing layer can be within a range from 1 to 100 nm. The thickness is defined from a point where the amount of variation of the atomic percentage of carbon is equal to 50%, to the surface. If the depth from the point where the difference between the maximum and minimum atomic percentages of carbon is equal to 50%, to the surface is less than 1 nm, the above-mentioned effects cannot be obtained because of insufficient mixing effect. On the other hand, if the depth exceeds 100 nm, the surface becomes rougher, thus deteriorating molding performance, and the stress of the film increases to generate small peelings at the molding operation. A more preferred thickness is within a range from 20 to 40 nm. Such mixing layer, being very thin, is almost free from the drawback of film peeling by the internal or thermal stress of the film, which becomes a problem when the film thickness is larger. Even in case of film peeling, the molding performance is not affected because of the small film thickness. Also, because of the small film thickness, the surface hardness and the thermal stability at the high temperature can be governed by the mold base of the mold, and a thermally stable state can be maintained in the molding temperature region. Consequently, the mold base is ideally composed of a material of a single composition which consists of an element providing a stable mixing state and easily combining with carbon (easily forming carbide), and which is excellent in the mechanical strength, the surface hardness and the oxidation resistance at the high temperature region. These conditions can be satisfied by forming an intermediate layer on the molding surface of the mold base. The intermediate layer can be composed of Si, Al, a metal of the group 4A, 5A or 6A of periodic table, carbides, nitrides, carboxides, carboxinitrides, borides or boronitrides thereof, boron carbide, boron nitride, or a compound or a mixture containing at least one of the foregoing. The material of the intermediate layer can be so selected to have a high adhesion strength to the mold base, and the intermediate layer can have a necessary minimum thickness. The mixing layer may also contain oxygen, hydrogen, nitrogen and other elements employed in the raw material gas for the mixing layer formation, such as Ar and F, in a range from several to about fifteen atomic percent.

If the mold surface becomes rough or generates defects by the molding operations, the mixing layer can be removed by a dry process and then formed anew. This is based on a fact that the defects generated in the molding operations are limited to the mixing layer, because of the high surface hardness of the mold base. Etching by dry process can be achieved, for example, by plasma etching, sputter etching, ion beam etching or reactive ion etching. The etching gas can be $O_2$, $H_2$, $N_2$, Ar, air, $CF_4$ or mixtures thereof. There are preferably selected etching conditions which do not deteriorate the surface shape, particularly the surface roughness, of the mold. The elimination of the film is not limited to such dry process, but can naturally be achieved by mechanical polishing employing diamond grinding particles or chemical etching.

The mixing layer can be formed, for example, by plasma CVD, ion beam sputtering, ion beam evaporation, plasma sputtering, ion plating, ion implantation, ion beam mixing or MBE.

Examples of the gas to be employed in carbon mixing include hydrocarbons such as methane, ethane, propane, ethylene, benzene or acetylene; halogenated hydrocarbons such as methylene chloride, carbon tetrachloride, chloroform or trichloroethane; alcohols such as methyl alcohol or ethyl alcohol; ketones such as $(CH_3)_2CO$ or $(C_6H_5)_2CO$; and gasses such as CO or $CO_2$; and mixtures thereof with gas such as $N_2$, $H_2$, $O_2$, $H_2O$ or Ar. Also, the target to be employed in sputtering can be graphite of a high purity or glass-like carbon.

In the following there will be explained the formation of the mixing layer with a carbon ion beam.

Figure 13:
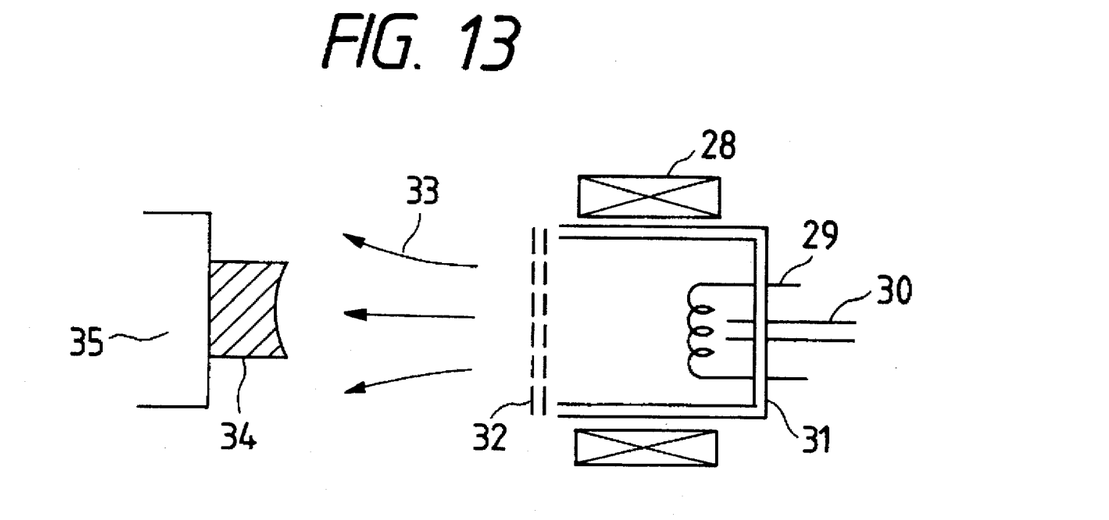
FIG. 13 is a schematic view of a Kaufmann ion source to be employed in the present invention.

The carbon ion beam is generated by a Kaufman ion source, of which a representative example is schematically shown in FIG. 13. In FIG. 13 there are shown a cylindrical coil 28 for generating a magnetic field; a filament 29; a gas inlet 30; an anode 31; an ion beam extracting electrode 32; an ion beam 33; a mold base 34; and a mold base holder 35 with a heating mechanism. The aforementioned raw material gas, for example $CH_4$ and $H_2$, is introduced from the gas inlet into the ionizing chamber to generate plasma, and the ion beam is extracted by a voltage applied to the extracting electrode, for irradiating the mold base.

The ion energy to the mold base is within a range from several hundred eV to several ten KeV. With the increase in the ion energy, the ion implanting effect becomes stronger, thus easily forming a mixing layer. When the carbon ions of several KeV or higher are irradiated onto the surface of the mold base, the surface is sputtered and the irradiating ions enter the surface by the implanting effect. Such entering ions collide with the atoms of the mold base and are stopped therein, losing the energy. As a result, there is formed a mixing layer consisting of the carbon atoms and the atoms of the mold base. The depth profile of the carbon atoms and the atoms of the mold base in the mixing layer can be controlled, for example, by a variation of the energy of the irradiating ions in time. A desired profile can be obtained for example by effecting irradiation with carbon ions of a high ion energy in the initial stage and decreasing the ion energy by gradually reducing the voltage of the extracting electrode. Otherwise, in case of forming the intermediate layer on the mold base, the irradiation is conducted with the carbon ions of a high ion energy while the material of the intermediate layer is evaporated, thereby forming a carbide intermediate layer. In this state the film forming rate of the evaporating material is gradually reduced, and the evaporation is eventually terminated, while the irradiation with the carbon ions is continued, thereby obtaining are an intermediate layer and a mixing layer of a desired depth profile.

The mixing state of the atoms in the mixing layer is not limited to that shown in FIG. 1A, but can be, for example, linearly or stepwise varied. That is, the atomic percentages of carbon and other elements in the mixing layer may assume the distribution mentioned before, and the profile thereof is not limited to a single pattern. Ideally, however, the atomic percentage of the carbon atoms is 100% and that of other elements is 0% at the surface. Also, the atomic percentage in the mold base or in the intermediate layer need not necessarily be stoichiometric.

As explained in the foregoing, the present invention is to provide a mold for forming an optical element, excellent in durability, by forming, at least on the molding surface of the mold base of the mold, a mixing layer consisting of carbon and at least an element constituting said mold base or an intermediate layer formed on the surface of said mold base. Also, the present invention is not limited to the optical elements such as lens, mirror, grating or prism, but is naturally applicable to other molded articles of glass or plastics.

DETAILED DESCRIPTION OF THE PREFERRED EMBODIMENTS

Now the present invention will be clarified by preferred embodiments thereof shown in the attached drawings.

[Embodiment 1 (Si, C) Mixing Layer]

Figure 2:
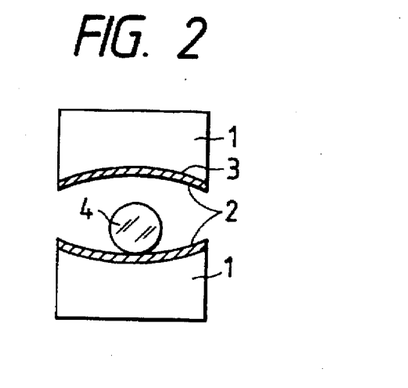
FIG. 2 is a cross-sectional view of the mold for the optical element of the present invention, in a state prior to press molding.
Figure 3:
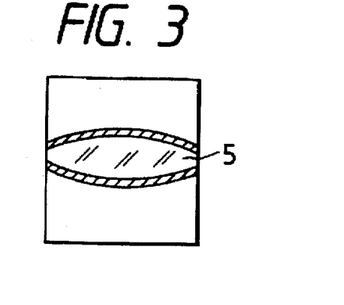
FIG. 3 is a cross-sectional view of a mold for the optical element of the present invention, in a state after press molding.

FIGS. 2 and 3 show an embodiment of the mold of the present invention, for forming an optical element. FIG. 2 shows the state of the press molding surface for the optical element, while FIG. 3 shows a state after the molding of the optical element. There are illustrated a mold base 1 for the mold; a molding surface 2 for molding the glass material; a mixing layer 3; an intermediate layer 3'; a glass material 4; and an optical element 5. The optical element 5, such as a lens, is obtained by press molding of the glass material 4 placed between the molds as shown in FIG. 2.

Figure 4:
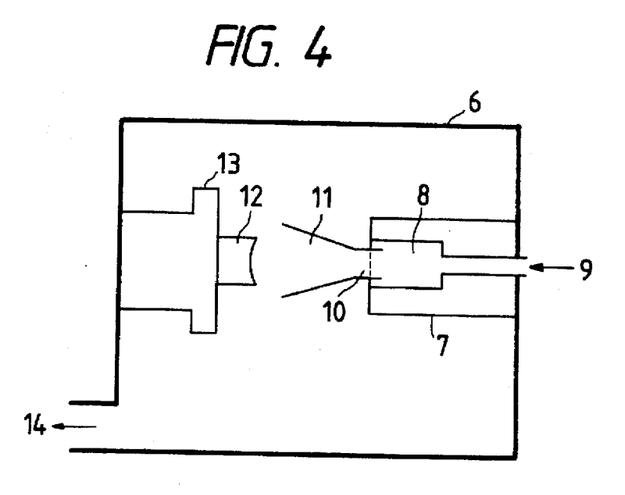
FIG. 4 is a schematic view of an IBD apparatus employed in an embodiment of the present invention.
Figure 5:
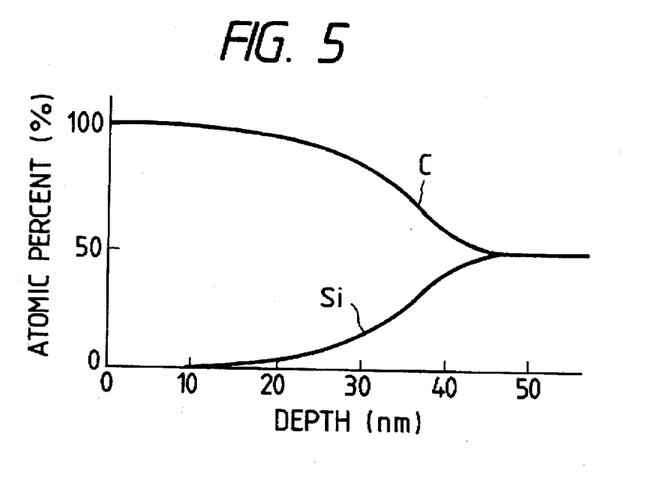
FIG. 5 is a chart showing the depth profile, obtained by AES, in the mixing layer embodying the present invention.

In the following there will be given a detailed explanation on the mold of the present invention, for forming the optical element:

A mold base of the mold was obtained by working sintered SiC into a predetermined shape, then forming a polycrystalline SiC film by CVD, and mirror-polishing the molding surface to $R_{max}=0.02$ µm. After sufficient washing, the mold base was placed in an IBD (ion beam deposition) apparatus shown in FIG. 4, in which are illustrated a vacuum tank 6; an ion beam source 7; an ionizing chamber 8; a gas inlet 9; an ion beam extracting grid 10; an ion beam 11; a mold base 12 of the mold; a mold base holder 13 with a heater; and an evacuating aperture 14. At first, Ar gas was introduced at 35 sccm from the gas inlet into the ionizing chamber and ionized therein. Then, an ion beam was extracted by the application of a voltage of 500 V to the ion beam extracting grid, and the mold base was irradiated with the ion beam for 5 minutes to clean the molding surface. Subsequently, $CH_4$ at 15 sccm and $H_2$ at 30 sccm were introduced into the ionizing chamber to a pressure of 3.5× 10−4 Torr, and an ion beam was extracted with an accelerating voltage of 10 kV to irradiate the molding surface, thereby forming a mixing layer of a thickness of 35 nm. This operation was conducted with an ion beam current of 30 mA, a current density of 2 $mA/cm^2$ and a mold base temperature of 300° C. FIG. 5 shows the result of analysis, by AES (Auger Electron Spectroscopy). In the direction of depth of a mixing layer of a sample prepared under the same conditions. As will be apparent from FIG. 5, the percentage of carbon decreases from 100% at the surface toward the mold base. On the other hand, the percentage of Si atoms increases from 0% at the surface toward the mold base. FIG. 5 shows the depth profile of percentages of C and Si. At the mold base side, C and Si respectively have a percentage of 50%, corresponding to stoichiometry of SiC. As explained before, the thickness of the mixing layer is defined by the distance from a depth where the carbon percentage corresponds to 50% of the variation from the maximum to minimum of the carbon percentage, to the surface.

Figure 6:
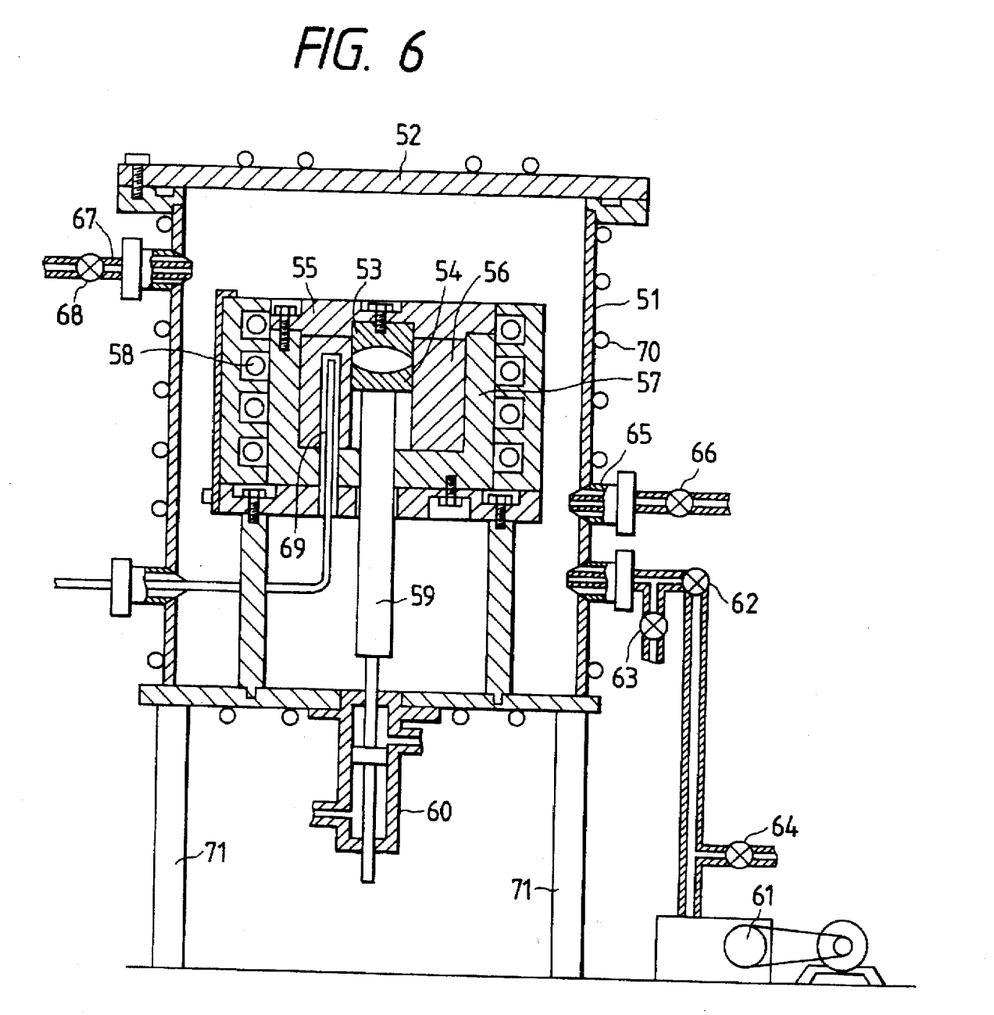
FIG. 6 is a cross-sectional view of a non-continuous lens molding apparatus utilizing the mold for the optical element of the present invention.

In the following there will be explained an example of press molding of glass lenses with the mold of the present invention for the optical element. Referring to FIG. 6, there are shown a vacuum tank 51; a cover 52 thereof; an upper mold 53 for molding the optical element; a lower mold 54; an upper mold support 55 for pressing the upper mold; a cylindrical mold 56; a mold holder 57; a heater 58; a push-up rod 59 for pushing up the lower mold; an air cylinder 60 for driving the push-up rod; an oil rotary pump 61; valves 62, 63, 64; an inert gas supply pipe 65; a valve 66; a leak valve 67; a valve 68; a temperature sensor 69; a cooling water pipe 70; and a base 71 for supporting the vacuum tank.

The lens manufacturing process is conducted in the following manner.

Figure 7:
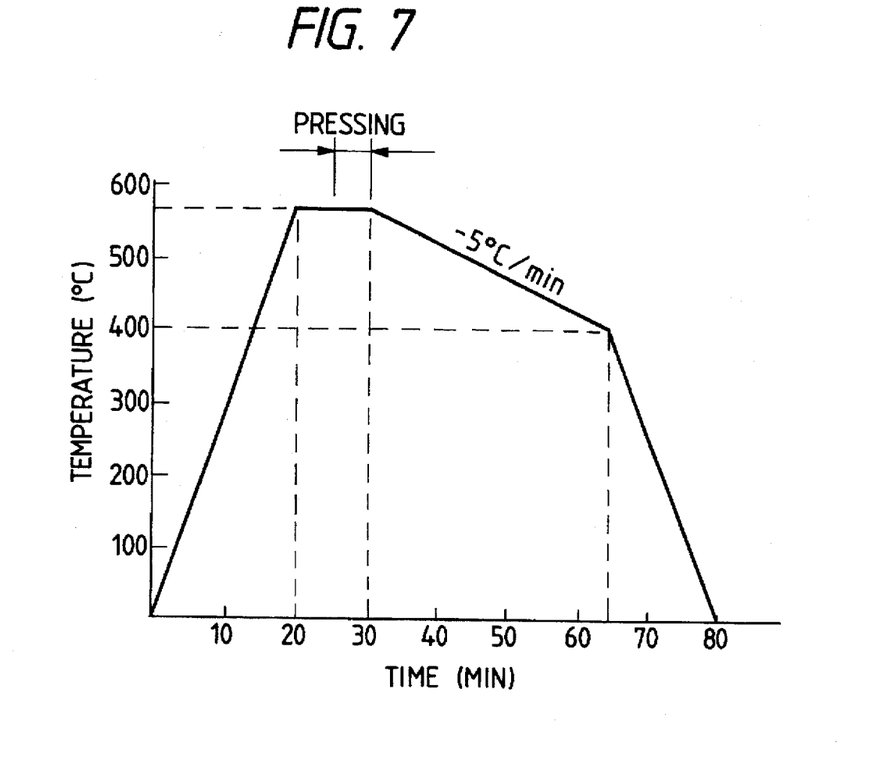
FIG. 7 is a chart showing the relationship between time and temperature in the lens molding.

Flint optical glass (SF14) adjusted to a predetermined amount and made spherical, is placed in the cavity of the molds, which are then placed in the molding apparatus. After the molds charged with the glass material are placed in the apparatus, the cover 52 of the vacuum tank 51 is closed, then water is supplied to the cooling water pipe 70 and the heater 58 is activated. In this state the nitrogen valves 66, 68 are closed, and the evacuating valves 62, 63, 64 are also closed, but the oil rotary pump 61 is operated continuously. The valve 62 is opened to start evacuation, and is closed when the pressure reaches $10^{-2}$ Torr or lower, and the valve 66 is opened to introduce nitrogen gas from a container into the vacuum tank. When a predetermined temperature is reached, the air cylinder 60 is operated to effect pressurization for 1 minute at a pressure of 200 kg/cm$^2$. After the pressure is released, cooling is conducted with a cooling rate of $-5°$ C./min. to a temperature below the transition point, and is then continued with a cooling rate of $-20°$ C./min or larger. When the temperature becomes lower than 200° C., the valve 66 is closed and the valve 63 is opened to introduce air into the vacuum tank. Then, the lower 52 and the upper mold support are removed, and the molded product is taken out. A lens 5 shown in FIG. 3 was prepared in the above-explained manner with flint optical glass SF14 (softening point Sp=586° C.; transition temperature Tg=485° C.). The molding condition, or the time-temperature relationship, is shown in FIG. 7.

The molding operation was conducted 300 times with the above-explained mold. In the observations under an optical microscope and a scanning electron microscope (SEM), the mold after the molding operations did not show defects such as scars or cracks, nor Pb precipitation resulting from reduction of PbO contained in the glass nor glass fusion. Also, the molded products were satisfactory in the surface roughness, surface precision, transmittance and shape precision, and were free from Pb precipitation or retention of the gas used in the molding operation.

Figure 8:
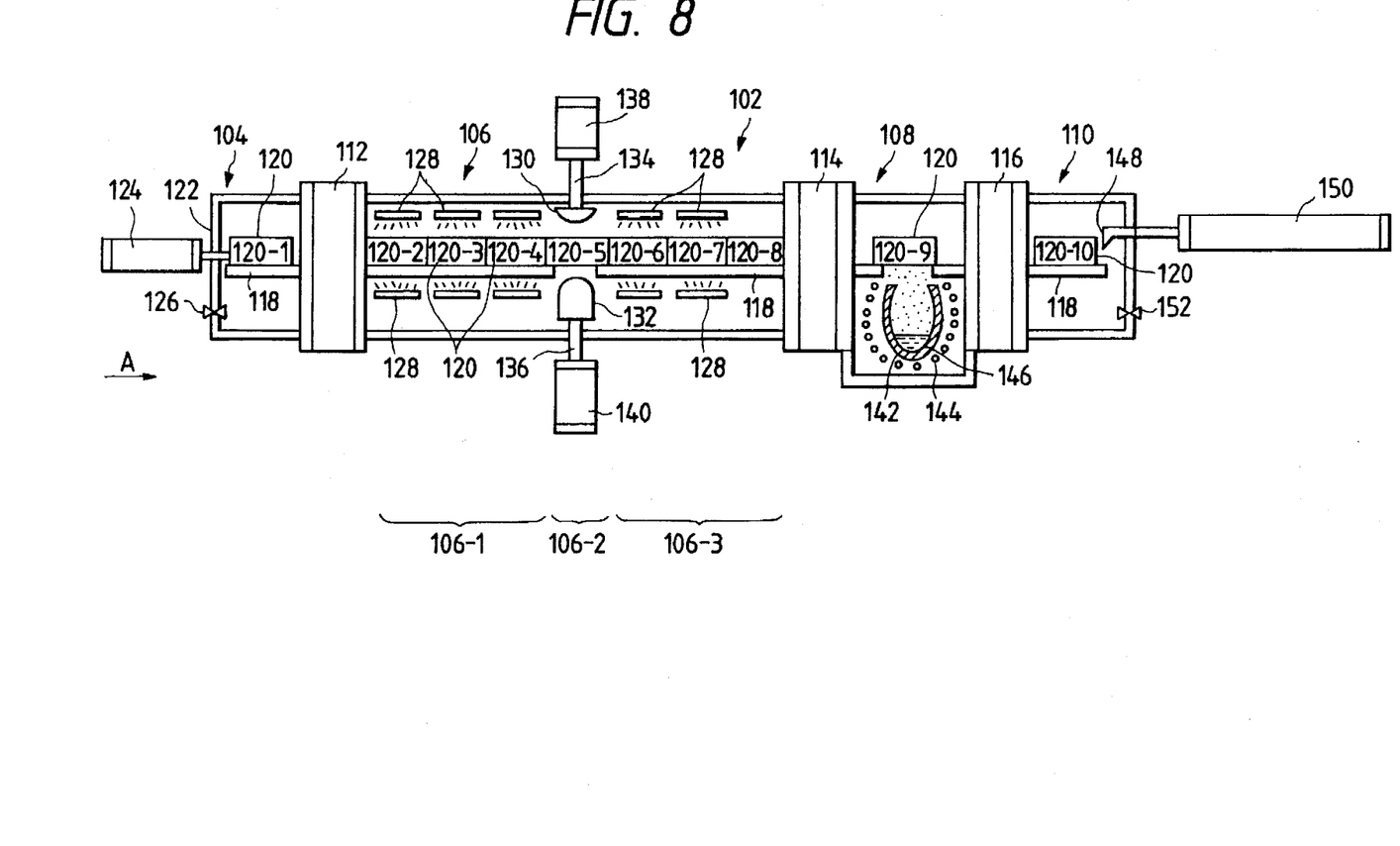
FIG. 8 is a cross-sectional view of a continuous lens molding apparatus utilizing the mold for the optical element of the present invention.

Then, the mold was used in the molding operation, employing the molding apparatus shown in FIG. 8.

In FIG. 8, there are shown a molding apparatus 102; an in-take replacement chamber 104; a molding chamber 106; an evaporation chamber 108; a take-out replacement chamber 110; gate valves 112, 114, 116; rails 118; a palette 120 transported on the rails in a direction A; cylinders 124, 138, 140, 150; valves 126, 152; and heaters 128 positioned along the rails 118 in the molding chamber 106.

The interior of the molding chamber 106 is divided, along the transport direction of the palette, into a heating zone 106-1, a pressing zone 106-2 and an annealing zone 106-3. In the pressing zone 106-2, an upper mold 130 is fixed to the lower end of a rod 134 of the cylinder 138, while a lower mold 132 is fixed to the upper end of a rod 136 of the cylinder 140. The upper mold 130 and lower mold 132 are those embodying the present invention. In the evaporation chamber 108, there are provided a container 142 containing a material to be evaporated, and a heater 144 for heating the container.

A glass blank for molding was obtained by working crown optical glass SK12 (softening point Sp=672° C.; transition temperature Tg=550° C.) approximately to predetermined shape and dimension. The glass blank was placed on the palette 120, which was placed at a position 120-1 in the intake replacement chamber 104 and was transported by a rod 122 of the cylinder 124 in a direction A, to a position 120-2 in the molding chamber 106 across the gate valve 112. Subsequently, the palette was transported from the position 120-2, in succession at predetermined timings, with the introduction of new palettes, to a position 120-8. In the course of the transportation, the glass blank was gradually heated by the heaters 128 in the heating zone 106-1 to a temperature above the softening point at a position 120-4, and was then transported to the pressing zone 106-2 where the cylinders 138, 140 were operated to effect the pressing for 1 minute with the upper mold 130 and the lower mold 132 with a pressure of 200 kg/cm$^2$ and a pressing temperature of 620° C. Subsequently, the pressure was released, and cooling was conducted to a temperature below the glass transition point. Then, the cylinders 138, 140 were operated to release the molded glass from the upper mold 130 and the lower mold 132. In the above-mentioned pressing operation, the palette was utilized as the cylindrical mold. Subsequently, the molded glass was gradually cooled in the annealing zone 106-3. The molding chamber 106 was filled with inert gas. After having reached the position 120-8 in the molding chamber 106, the palette was transported, at a next step, to a position 120-9 in the evaporation chamber 108 across the gate valve 114. This chamber is usually used for vacuum evaporation, which was, however, not conducted in this embodiment. At a next step, the palette was transported to a position 120-10 in the take-out replacement chamber 110, across the gate valve 116. At the next transport step, the cylinder 150 was operated to discharge the molded glass from the molding apparatus 102 by means of a rod 148.

After moldings 3000 times in the above-explained process, there were observed satisfactory results in the molding surface of the mold, the surface roughness of the molded optical elements, and the releasing property of the mold members from the molded optical element. Also, in the observations under an optical microscope and a scanning electron microscope, the molding surface of the mold was free from defects such as scars or cracks, precipitate from reaction with glass components or glass sticking.

[Embodiment 2 (Si, C) Mixing Layer]

A mold base same as in the embodiment 1 was subjected to the formation of a mixing layer, under same method and conditions, except that the thickness of the mixing layer was varied as 0.9, 40 and 101 nm, by variations in the film forming time. Each of thus obtained three molds was employed in the molding apparatus shown in FIG. 8, for molding flint optical glass SF14 (softening point Sp=586° C.; transition temperature Tg=485° C.) 1000 times. The obtained results are shown in Table 1.

TABLE 1

| Mold | Mixing layer | Mold surface roughness ($R_{max}$) | Releasing property |
|---|---|---|---|
| 1 | 0.9 nm | ≦0.03 μm | glass fusion |
| 2 | 40 nm | ≦0.03 μm | satisfactory |
| 3 | 101 nm | ≧0.05 μm | satisfactory |

In the observations under an optical microscope and a scanning electron microscope, the mold 2 after the molding operations did not show defects such as scars or cracks, nor Pb precipitation resulting from reduction of PbO contained in the glass nor glass fusion. Also, the molded products were satisfactory in the surface roughness, surface precision, transmittance and shape precision, and were free from Pb precipitation or retention of the gas used in the molding operation. On the other hand, the mold 1 showed local glass fusion when the molding operations exceeded 500 times, while the mold 3 showed slight peeling when the molding operations exceeded 300 times.

[Embodiment 3 (Ti, N, C) Mixing Layer, TiN Intermediate Layer]

Figure 14:
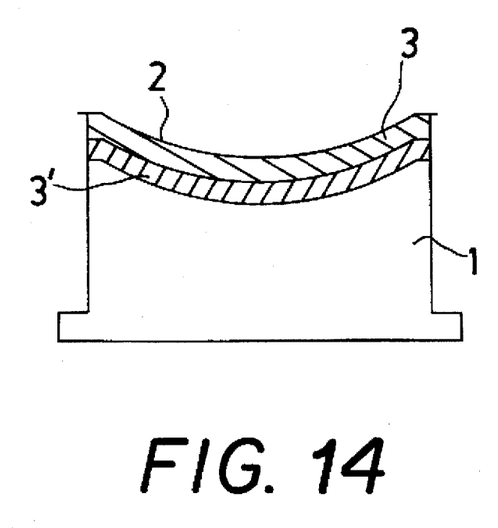
FIG. 14 is a cross-sectional view of a mold for the optical element of the present invention containing an intermediate layer, in a state prior to press molding.

FIG. 14 shows an embodiment of the mold of the present invention for forming an optical element. Illustrated is a mold base 1 for the mold; a molding surface 2 for molding the glass material; an intermediate layer 3'; and a mixing layer 3.

A mold base of the mold was obtained by working a sintered material consisting of WC (84%)-TiC (8%)-TaC (8%) into a predetermined shape and mirror-polishing the molding surface to $R_{max}$=0.02 μm. On the molding surface of the mold base, a Ti film of 200 nm and then a TiN film of 1800 nm were formed by ion plating. The thus obtained mold base was subjected to the formation of a mixing layer of 50 nm, under same method and conditions as in the embodiment 1. The thus obtained mold was used in the molding apparatus shown in FIG. 8, in the same manner as in the embodiment 1, for molding crown glass SK12 (softening point Sp=672° C.; glass transition temperature Tg=550° C.) 1000 times. There were obtained results similar to those in the embodiment 1.

[Embodiment 4 (Si, N, C) Mixing Layer]

A mold base was obtained by working sintered $Si_3N_4$ into a predetermined shape and mirror-polishing to $R_{max}$=0.03 μm. The molding surface of the mold base was subjected, by an ion implanting apparatus (not shown), to implantation of $C^{+12}$ of an energy of 10 keV with an ion concentration of $5 \times 10^{17}$ ion/cm$^2$, whereby a mixing layer was formed with a thickness of 20 nm. In this operation, the energy of the implanted ions was gradually varied from 10 to 1 keV. Thus obtained mold was employed in the molding apparatus shown in FIG. 8, in the same manner as in the embodiment 1, for molding crown glass SK12 (softening point Sp=672° C.; glass transition temperature Tg=550° C.) 1000 times. Obtained results were similar to those in the embodiment 1.

[Embodiment 5 (Si, C) Mixing Layer, SiC Intermediate Layer]

Figure 9:
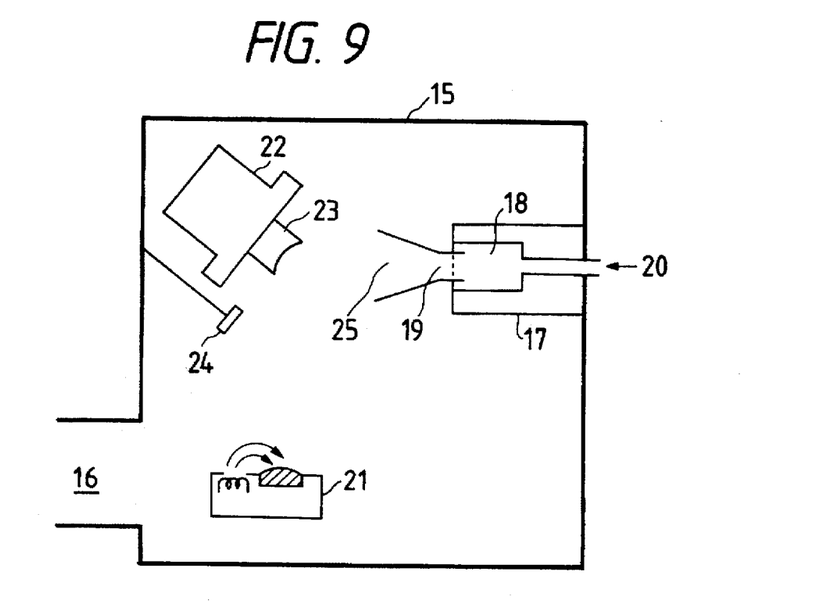
FIG. 9 is a schematic view of an ion beam mixing apparatus employed in embodiments of the present invention.
Figure 10:
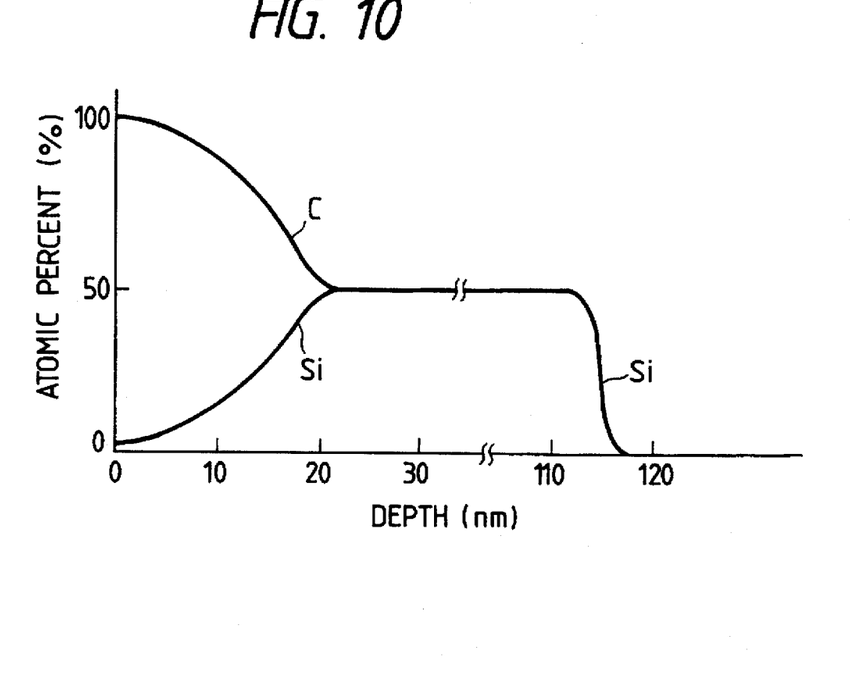
FIGS. 10 and 11 are views showing depth profiles by AES in a mixing layer embodying the present invention.

A mold base same as in the embodiment 3 was subjected to the formation of a mixing layer, in an ion beam mixing apparatus shown in FIG. 9. In FIG. 9 there are illustrated a vacuum tank 15; an evacuating system 16; an ion source 17; an ionizing chamber 18; an ion beam extracting grid 19; a gas supply system 20; an electron gun 21; a mold base holder 22 with a heater; a mold base 23; a crystal film thickness monitor 24; and an ion beam 25. After the mold base was mounted on the holder, the apparatus was evacuated to $5 \times 10^{-6}$ Torr and Ar gas was introduced from the gas supply system to the ion source. The obtained Ar ion beam was used for cleaning the surface of the mold base and eliminating the oxide film from the surface. This operation was conducted with a pressure of $3 \times 10^{-4}$ Torr and an ion current of 7 mA. Then, with the evaporation of Si of 99.999% by the electron gun and the introduction of $C_6H_6$ at 50 sccm and Ar at 10 sccm from the gas supply system to the ion source, a voltage of 700 V was applied to the ion beam extracting grid to extract an ion beam for irradiating the mold base. This operation was conducted with an ion current of 10 mA, a pressure of $1 \times 10^{-3}$ Torr and a mold base temperature of 300° C. This Si evaporation and the carbon ion beam irradiation were simultaneously conducted under the above-mentioned conditions to form a SiC layer of a thickness of 100 nm, and then the power of the electron gun was gradually reduced, thereby forming a mixing layer of 15 nm consisting of Si and C, by the irradiation of the carbon ion beam only. The depth profile obtained by AES, is shown in FIG. 10. A molding test as in the embodiment 1 employing thus obtained mold was performed, and results similar to those in the embodiment 1 were obtained. Also, when the SiC intermediate layer was replaced by the intermediate layers respectively consisting of Si, Al, metals of the groups 4A, 5A and 6A of periodic table, carbides, nitrides, carboxides, carbonitrides, borides and boronitrides thereof, boron carbide, boron nitride, and a compound or a mixture composed of at least one of the foregoing, there could be obtained results similar to the case of SiC intermediate layer.

[Embodiment 6 (Ti, C) Mixing Layer, TiC Intermediate Layer]

Figure 11:
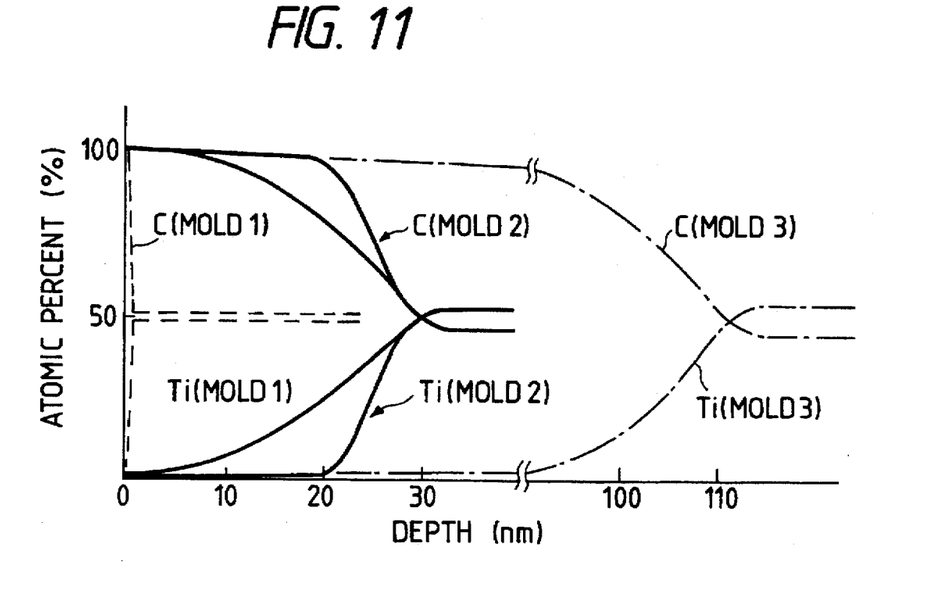

A mold base same as in the embodiment 5 was subjected to the formation of a TiC intermediate layer and a Ti, C mixing layer under same method and conditions, except that Si was replaced by Ti of a purity of 99.9%. The thickness of the mixing layer was varied as 0.8, 25 and 105 nm, by variations in the film forming time. FIG. 11 shows the depth profiles obtained by AES, of samples prepared under the same conditions. Each of thus obtained three molds was used in the molding apparatus shown in FIG. 8 in the same manner as in the embodiment 1 for molding crown glass SK12 (softening point Sp=672° C.; glass transition temperature Tg=550° C.) 1000 times. The obtained results are shown in Table 2.

TABLE 2

| Mold | Mixing layer | Mold surface roughness ($R_{max}$) | Releasing property |
|---|---|---|---|
| 1 | 0.8 nm | ≦0.03 μm | glass fusion |
| 2 | 25 nm | ≦0.03 μm | satisfactory |
| 3 | 105 nm | ≧0.05 μm | satisfactory |

The mold 2 after the molding operation indicated results similar to those of the embodiment 1. The mold 1 showed local glass fusion when the molding operations exceeded 400 times, while the mold 3 showed slight peeling when the molding operations exceeded 400 times.

[Embodiment 7 (Si, C) Mixing Layer]

A mold employing a mold base same as in the embodiment 1 and prepared under same method and conditions as in the embodiment 1 was used in the molding apparatus shown in FIG. 8 as in the embodiment 1 for molding crown glass SK12 (softening point Sp=672° C.; glass transition temperature Tg=550° C.) 2000 times. Then, the mold was taken out from the molding apparatus and placed in the IBD apparatus shown in FIG. 4. After the apparatus was evacuated as in the embodiment 1, Ar gas was introduced at 35 sccm from the gas supply system into the ionizing chamber and was ionized. Then, a voltage of 500 V was applied to the ion beam extracting grid to obtain an Ar ion beam, for irradiating the mixing layer on the molding surface, thereby eliminating the mixing layer. In succession a mixing layer was formed again, under the same conditions as in the embodiment 1. The regenerated mold was employed in the molding apparatus shown in FIG. 8 for molding crown glass SK12 (softening point Sp=672° C.; glass transition temperature Tg=550° C.) 2000 times. There could be obtained results similar to those in the embodiment 1.

Figure 12:
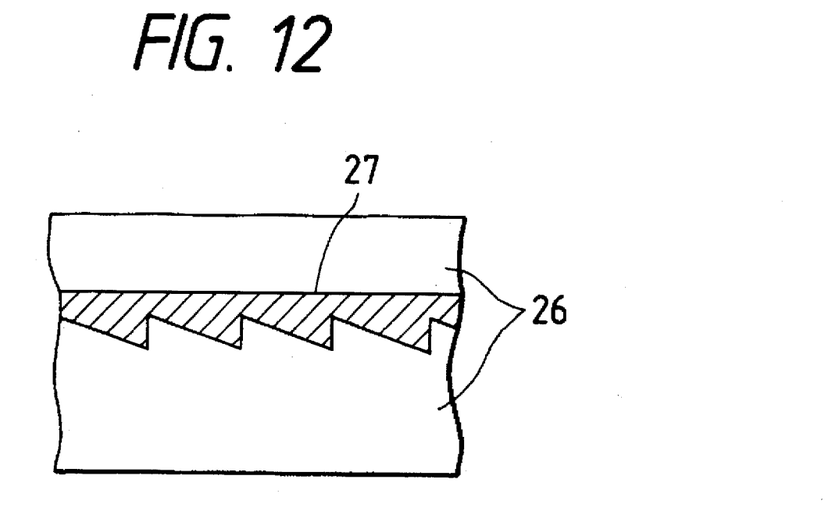
FIG. 12 is a cross-sectional view of a grating mold embodying the present invention.

Also, a grating mold as shown in FIG. 12, prepared by same method and conditions as in the embodiment 1 and used in the molding of crown glass SK12 showed satisfactory releasing property and could repeatedly provide gratings, on which the form of the mold was faithfully transferred. In FIG. 12 there are shown a grating mold 26; and a molded glass grating 27.

As explained in the foregoing, the present invention provides a mold for forming an optical element, having a mirror surface which has few surface defects and does not generate film peeling or cracks in the glass molding operations, by forming, at least at the surfacial part of the molding surface, a mixing layer consisting of carbon and at least an element constituting the mold base of the mold or an intermediate layer formed on the molding surface. When used in the molding of a glass optical element, the mold shows extremely satisfactory releasing property from the glass, and can provide molded products which are satisfactory in the surface roughness, surface precision, transmittance and shape precision. Also, the mold is extremely durable without generating defects such as film peeling, cracks or scars, even after prolonged press molding operations.

Thus the mold of the present invention, for forming an optical element, can achieve an improvement in productivity and a cost reduction.

What is claimed is:

1. A mold for press molding an optical element of glass, comprising a mixing layer on at least a surface of a mold base, the mixing layer having a first surface adjacent to the mold base and a second surface opposite the mold base, the mixing layer consisting essentially of carbon and at least one element constituting the mold base, wherein atomic percentage of carbon increases toward the second surface of the mixing layer and decreases toward the first surface of the mixing layer, while atomic percentage of said at least one element decreases toward the second surface of the mixing layer and increases toward the first surface of the mixing layer.

2. A mold according to claim 1, wherein thickness of said mixing layer is within a range from 1 to 100 nm.

3. A mold according to claim 1, wherein said mixing layer contains at least one element selected from the group consisting of oxygen, hydrogen and nitrogen.

4. A mold for press molding an optical element of glass, comprising:

an intermediate layer formed at least on a surface of a mold base of said mold, the intermediate layer having a first surface adjacent to the mold base and a second surface opposite the mold base; and a mixing layer which is formed on the second surface of the intermediate layer, the mixing layer having a first surface adjacent to the second surface of the intermediate layer and a second surface opposite the second surface of the intermediate layer, the mixing layer consisting essentially of carbon and at least one element constituting said intermediate layer, wherein atomic percentage of carbon increases toward the second surface of the mixing layer and decreases toward the first surface of the mixing layer, while atomic percentage of said at least one element decreases toward the second surface of the mixing layer and increases toward the first surface of the mixing layer.

5. A mold according to claim 4, wherein thickness of said mixing layer is within a range from 1 to 100 nm.

6. A mold according to claim 4, wherein said mixing layer contains at least one element selected from the group consisting of oxygen, hydrogen and nitrogen.

7. A mold according to claim 4, wherein said intermediate layer consists essentially of Si, Al, a metal of the group 4A, 5A or 6A of periodic table, a carbide, a nitride, a carboxide, a carboxinitride, a boride or a boronitride thereof, boron carbide, boron nitride, or a compound or a mixture containing at least one of the foregoing.

* * * * *

UNITED STATES PATENT AND TRADEMARK OFFICE
CERTIFICATE OF CORRECTION

PATENT NO. : 5,676,723

DATED : October 14, 1997

INVENTOR(S) : YASUSHI TANIGUCHI, ET AL.          Page 1 of 3

It is certified that error appears in the above-identified patent and that said Letters Patent is hereby corrected as shown below:

ON THE TITLE PAGE

AT [56] REFERENCES CITED - U.S. PATENT DOCUMENTS

"1301864" should read -- 1-301864--.

AT [56] REFERENCES CITED - OTHER PUBLICATIONS

"Asahi Optiacl" should read --Asahi Optical--.

ABSTRACT

Line 1, "pressing" should read --press--.

COLUMN 1

Line 12, "pressing" should read --press--.

COLUMN 3

Line 66, "periodic" should read --the periodic--.

COLUMN 4

Line 21, "film" should read --layer--.

UNITED STATES PATENT AND TRADEMARK OFFICE
CERTIFICATE OF CORRECTION

PATENT NO. : 5,676,723

DATED : October 14, 1997

INVENTOR(S) : YASUSHI TANIGUCHI, ET AL.

It is certified that error appears in the above-identified patent and that said Letters Patent is hereby corrected as shown below:

COLUMN 5

Line 10, "are" should be deleted;
    Line 64, "and" should be deleted; and
    Line 67, "invention;" should read --invention; and--.

COLUMN 6

Line 41, "10-4 Torr," should read --$10^{-4}$ Torr,--; and
    Line 47, "Spectroscopy). In" should read --Spectroscopy) in--.

COLUMN 7

Line 28, "lower 52" should read --cover 52--; and
    Line 29, "support" should read --support 55--.

COLUMN 9

Line 41, "Thus" should read --The thus--.

COLUMN 10

Line 11, "AES," should read --AES--; and
    Line 17, "periodic" should read --the periodic--.

UNITED STATES PATENT AND TRADEMARK OFFICE
CERTIFICATE OF CORRECTION

PATENT NO. : 5,676,723
DATED : October 14, 1997
INVENTOR(S) : YASUSHI TANIGUCHI, ET AL.

Page 3 of 3

It is certified that error appears in the above-identified patent and that said Letters Patent is hereby corrected as shown below:

<u>COLUMN 12</u>

```
Line 6,  "thickness" should read --the thickness--;
Line 30, "thickness" should read --the thickness--; and
Line 37, "periodic"  should read --the periodic--.
```

Signed and Sealed this

Thirtieth Day of June, 1998

Attest:

BRUCE LEHMAN

*Attesting Officer*   *Commissioner of Patents and Trademarks*